US011980784B2

(12) United States Patent
Darnell

(10) Patent No.: US 11,980,784 B2
(45) Date of Patent: May 14, 2024

(54) AIR MOVER DEVICE AND METHOD FOR FIREFIGHTING

(71) Applicant: Wayne Darnell, Santa Fe, NM (US)

(72) Inventor: Wayne Darnell, Santa Fe, NM (US)

( * ) Notice: Subject to any disclaimer, the term of this patent is extended or adjusted under 35 U.S.C. 154(b) by 0 days.

(21) Appl. No.: 17/406,325

(22) Filed: Aug. 19, 2021

(65) Prior Publication Data

US 2021/0379429 A1 Dec. 9, 2021

Related U.S. Application Data

(63) Continuation-in-part of application No. 17/077,727, filed on Oct. 22, 2020, now Pat. No. 11,446,687.

(60) Provisional application No. 62/950,064, filed on Dec. 18, 2019.

(51) Int. Cl.

*A62C 3/02* (2006.01)
*A62C 99/00* (2010.01)
*B05B 7/24* (2006.01)

(52) U.S. Cl.

CPC ........ *A62C 3/0207* (2013.01); *A62C 99/0009* (2013.01); *B05B 7/2491* (2013.01)

(58) Field of Classification Search

CPC . A62C 7/0014; A62C 3/0207; A62C 99/0009; A62C 99/0072; B05B 7/2491; F04D 29/70–708; F04D 29/547; F04D 29/545; F04D 29/56; F04D 29/544

See application file for complete search history.

(56) References Cited

U.S. PATENT DOCUMENTS

| | | | | | |
|---|---|---|---|---|---|
| 2,920,464 | A * | 1/1960 | Trask | F24F 5/001 | 165/122 |
| 2,950,859 | A * | 8/1960 | Kirk | F04D 29/703 | 416/247 R |
| 3,309,847 | A * | 3/1967 | Donaldson | F01P 11/12 | 55/467 |
| 3,344,854 | A * | 10/1967 | Boyajian | F01P 11/06 | 165/95 |
| 3,724,554 | A * | 4/1973 | Rupert | A62C 27/00 | 169/24 |

(Continued)

FOREIGN PATENT DOCUMENTS

| | | |
|---|---|---|
| AU | 2015200481 | 2/2015 |
| DE | 000010051066 | 4/2002 |

*Primary Examiner* — Joseph A Greenlund
(74) *Attorney, Agent, or Firm* — Berg Hill Greenleaf Ruscitti LLP

(57) ABSTRACT

The invention includes an air mover device used for fire mitigation and protection. The core component is an air mover unit whose discharge airstream can be positioned using air rudders and/or a directional control assembly to provide air flows in optimum directions and capacity to counter unwanted fire progression or to promote fires in cases of back-burns. Additional support components include a power supply, its fuel source, a speed control mechanism for the air mover, an air mover inlet protective screen, a sparger unit to impart suppressant or retardant into the airstream, balancing feet, a removable nozzle, and instrumentation and controls to ensure function and safety of equipment and personnel. This device can be on a static or mobile platform, towed or self-propelled and can be locally or remotely controlled.

16 Claims, 9 Drawing Sheets

(56) References Cited

U.S. PATENT DOCUMENTS 4,026,469 A * 5/1977 Frankel ................. B05B 7/0807 239/78
4,057,105 A * 11/1977 Bailey .................... B60K 11/04 55/299
4,111,364 A * 9/1978 Schroeder ........... A01M 7/0014 15/340.1
4,427,074 A * 1/1984 Wollin .................... F04D 25/04 239/222.11
4,521,153 A * 6/1985 Morimoto ............. F04D 25/105 454/258
5,028,002 A * 7/1991 Whitford ............ A01M 7/0014 47/1.7
5,062,487 A * 11/1991 Siria .................... A62C 3/0207 169/70
5,125,797 A * 6/1992 Kapich ................... F01D 15/08 415/208.1
5,787,989 A * 8/1998 Elmenhorst .......... A62C 3/0207 169/14
6,257,498 B1 * 7/2001 Siebol ................. A01M 7/0014 47/2
6,302,332 B1 * 10/2001 Panneton ............ A01M 7/0067 239/8
6,311,780 B1 * 11/2001 Zuev ........................ B64D 1/16 169/53
6,446,731 B1 9/2002 Sorosky
7,055,615 B2 * 6/2006 Dillman ............... A62C 3/0292 169/46
7,140,449 B1 11/2006 Ebner
7,516,908 B1 * 4/2009 Sack .................... A62C 3/0207 239/525
8,292,980 B2 * 10/2012 Yamagishi ........... H04N 9/3141 96/429
9,248,325 B2 * 2/2016 Lewis .................. A62C 3/0207
9,764,174 B2 9/2017 Howard, Sr.
9,816,525 B1 * 11/2017 Sadler ..................... F04D 25/12
10,071,270 B2 * 9/2018 Krekoukis ............. A62C 25/00
10,100,836 B2 * 10/2018 Stickney ................. F04D 25/08
10,653,904 B2 5/2020 Conboy
10,765,974 B2 * 9/2020 Renz ....................... D06F 58/22
10,837,592 B2 * 11/2020 Coffman, III ............ F16M 1/04
11,446,687 B2 * 9/2022 Darnell ................... B05B 15/52
2001/0019082 A1 * 9/2001 Nishimura .......... A01M 7/0014 239/164
2003/0006295 A1 * 1/2003 Kenny ................ A01M 7/0014 239/164
2006/0260824 A1 11/2006 Dillman
2007/0272797 A1 11/2007 Skurkovich et al.
2008/0098889 A1 * 5/2008 Passoni ................ A62C 3/0207 95/149
2010/0218960 A1 * 9/2010 Dillman ................. A62C 27/00 169/45
2016/0354623 A1 * 12/2016 Mueller ................... F24F 11/79
2017/0030266 A1 2/2017 Matthew et al.
2017/0259094 A1 * 9/2017 Sibila ................. A62C 99/0072
2018/0043193 A1 * 2/2018 Delerue ................ F04D 19/002
2019/0100311 A1 4/2019 Yu
2019/0111444 A1 * 4/2019 Rogers ................... A62C 5/008
2019/0178590 A1 * 6/2019 Vanberg .................. F28F 19/01
2020/0130476 A1 * 4/2020 Lenz, Jr. .............. B60H 3/0641
2020/0208654 A1 * 7/2020 Weinmeister ......... F04D 25/084
2021/0113873 A1 * 4/2021 Villeneuve ........... A62C 3/0292
2021/0170431 A1 * 6/2021 Inoue ...................... B05B 17/04
2021/0187528 A1 * 6/2021 Darnell ................. B05B 7/2491
2021/0379429 A1 * 12/2021 Darnell .............. A62C 99/0009

* cited by examiner

AIR MOVER DEVICE AND METHOD FOR FIREFIGHTING

CROSS-REFERENCES TO RELATED APPLICATIONS

This application is a continuation-in-part application of U.S. patent application Ser. No. 17/077,727 filed on Oct. 22, 2020, which claims priority to US provisional application Ser. No. 62/950,064 filed on Dec. 18, 2019, the entirety of each which are incorporated by reference herein.

FIELD OF THE INVENTION

The invention relates to devices and methods for firefighting, and more particularly, to a device and method of firefighting that incorporates an air mover to produce a high volume and high velocity airstream coupled with a removable discharge nozzle, an air rudder, and a directional control assembly for mounting the air mover that enables selective horizontal positioning of the airstream and selective vertical adjustment of the airstream. A sparger element is provided to selectively inject a fire suppressant or retardant into the airstream.

BACKGROUND OF THE INVENTION

According to the United States Department of Agriculture (USDA) Forest Service, over the last three decades, wildland fires have dramatically increased in size and complexity. Although these fires have become more difficult to control, the equipment and methods of firefighting have not adapted to handle these fires. Computer modeling of fire behavior is developing to assist in wildfire management, but field firefighting tools and methods remain much the same.

Surface wind is often the dominant environmental variable affecting wildland fire intensity and spread. Wind variations on a small scale can cause sudden and dramatic changes in fire behavior, significantly influencing fire growth at larger scales. Current methods for fighting smaller scale fires focus almost exclusively on extinguishing flames through the use of suppressants and retardants. Burn backs may be employed to establish barriers to fire advancement, but these efforts are largely dependent on natural conditions. Many times, despite best efforts of courageous firefighters, the fires rage on uncontained which requires evacuation of people, possessions, and animals as the fire advances.

A number of patent references disclose the use of targeted air streams and/or entrained aerosols to address fire risks. However, these references only teach fire extinguishing or to remove smoke or flames from an immediate area to provide protection to the firefighters or victims of the fire.

One example of a reference that discloses fire control is U.S. Pat. No. 10,071,270 (Spray Jet Discharging Device). This invention provides a spray jet discharging device of long range, whose function is based on the production of a powerful air stream with liquid droplets dispersed therein. The air stream is produced by a centrifugal fan with a spiral housing. The fan may be mounted at fixed points or on land vehicles via a suitable support for the fan, which enables both rotation of the spray jet beam in the horizontal plane and changing of its inclination angle in the vertical plane. The device may be remotely controlled or manually operated. There is also a version of the device for aerial firefighting operations configured to be suspended from an aircraft. This reference suggests the use of a high velocity, not high capacity, air mover resulting in a relatively small, concentrated air/water stream. The principal application of this device is to extinguish fire with aerosol spray and not to use the air stream itself for fire control or extinguishing. The discharge of an aerosol solution from such a long-distance results in much of the aerosol evaporating before it reaches the flames. Further, the discharge rate of the suppressant or retardant is of such a high rate that the suppressant inventory would be depleted within minutes if dependent only on the onboard inventory in a remote area where replenishment is not possible.

The resource needed for continued operation of my invention is air which is essentially infinite and which can be provided for the duration of fuel inventory for powering the driver for the air mover, i.e., hours, not minutes.

Another patent reference disclosing a firefighting device is the U.S. Pat. No. 9,248,325 (Assist Unit for Large Outdoor Fires) This invention uses an airstream to provide comfort and protection to assist personnel in fighting a fire. This invention is similar to the many commercial air mover designs which provide positive pressure ventilation in fire situations. According to the inventor, the device should always be behind the firefighters. The airstream of this device is not mentioned as a method to redirect or halt the fire or as a method to advance desired back burn fire progression. These methods are principal functions of my invention. This invention states that it can blow fire suppressors into a fire and smother it, but the design shows no feature or appurtenance (and no claim) that is part of the construction that would provide for that function. My invention offers features for a sparging unit for this purpose. This device offers no means of speed control for changing flow rates or flow velocities to address changing conditions or needs to optimize firefighting capabilities of their device. Our invention offers variable speed control of the air mover to control airstream velocities and flow rates.

Another prior invention is disclosed in the U.S. Pat. No. 7,140,449 (Air Blower for Extinguishing Fires and Method for Extinguishing Fires). This invention employs a blower of the type used by commercial landscapers, and the blower can be mounted on the back of the user. This device provides a pressurized airstream, but it is orders of magnitude smaller and, therefore, less capable than my invention which offers greater throw and spread of the air flow. My invention requires no firefighter to be dangerously dose to the flames unlike this invention This invention does not have the capability to perform most of the attributes of my invention and performs none of them to scale.

Another patent reference includes U.S. Pat. No. 7,055,615 (Method of Extinguishing Fires). This reference teaches a method for subduing a fire and entails the use of an operating jet turbine. The method is performed by operating a jet turbine having an exhaust to direct the exhaust into a moving front of the fire, generally against the movement of the front of the fire. A retardant preferably dirt, is directed from a supply tank into the exhaust, through a pressurized conduit. Alternately, dirt or other material is lifted from the land around the fire and blown into the fire, extinguishing the fire or decreasing its intensity. The reference states that to completely extinguish the fire, it may be necessary to further douse the fire with either or both water and a second retardant. The discharge temperature, air flow pressure, and thrust from this invention pose a significant risk to any personnel or structure in close proximity to the discharge of the jet engine. This invention is identified principally as a fire extinguishing device. Our invention offers some degree of fire extinguishment, but our emphasis is on controlling or redirecting flame fronts. This invention proposes to use dirt as an extinguishing agent. This would require a heavy layer of dirt on a burning fuel . . . enough to smother a fire. Therefore, a very large inventory of dirt is required . . . more than that which would practically be stored as inventory in an onboard tank. Consequently, this invention further suggests using as a backup to the onboard inventory of dirt, i.e., the dirt in the vicinity of the device. Without proper filtering/sifting of this dirt to remove a variety of materials such as stones, sticks, etc., serious problems could arise with the storage and transfer equipment used to deposit this dirt into the jet air stream. This would require a separate system to adequately process raw dirt for use. . . a major system addition (not described in the patent specification) to ensure continued operation of the invention's proposed function. This invention also requires a hydraulically controlled counterweight to maintain stability of the platform. This adds considerable weight and complexity to the proper functioning of the device. My invention is much simpler to control and operate with onboard resources.

Another patent reference is the U.S. Patent Application Publication No. 20100218960 (Method of Extinguishing Fires). This reference discloses a method for subduing a fire related to the Pat. No. 7,055,615 Patent, that is, use of a jet turbine. The specific method disclosed includes intentionally setting a fire in front of a larger advancing fire to create a back-burn space. The jet turbine is moved to a front of the back-burn and is operated to direct its exhaust as a motive force to steer and accelerate the flames of the back-burn.

In addition to the concerns expressed in the above discussion of Pat. No. 7,055,615, this application of the jet turbine device for the prescribed purpose of establishing a back burn is problematic for other reasons compared to my invention. The jet turbine exhaust will consist of mostly combustion gases, especially carbon dioxide, which will tend to extinguish the intended back burn flames rather than direct and accelerate them. My invention uses only air, offering an atmosphere conducive to combustion not to extinguishment. Use of a high pressure, high-capacity jet turbine to provide appropriately controlled flow rates to advance the flame deliberately but carefully in front of a back burn poses a problem due to the need for fine control of turbine outlet flow rates. This feature is not addressed in this invention. This invention does not describe control of the jet turbine discharge in the vertical or horizontal planes. My invention employs fine speed control for air flow rate, air rudders and a directional control assembly for horizontal and vertical directional control of the discharge airstream.

While the devices/systems of the prior art may be adequate for their intended purposes, the present invention as discussed below in various embodiments provides a superior solution for firefighting in many diverse environmental conditions. The specific advantages of the invention will be readily apparent from a review of the following description taken in conjunction with the drawings.

SUMMARY OF THE INVENTION

The invention in a preferred embodiment is a device that provides air movement at high volumes and speeds for use in fire mitigation, protection, and/or suppression (collectively hereinafter referred to as "fire control"). The device of the invention includes an air mover that can be appropriately positioned to provide air flows in an optimum directional flow and capacity to counter unwanted fire progression or to promote fire progression in the case of back-burns. The device further includes, according to one or more preferred embodiments, a means for providing a motive force for the air mover, a sparger unit to impart suppressant or retardant into the airstream, control surfaces for directing air flows, a protective air mover inlet screen, controls for platform components, balancing feet for stability, and instrumentation and controls to monitor and ensure function and safety of equipment and personnel. The invention also employs a directional control assembly for horizontal and vertical directional control of the discharge airstream.

The device can be mobile or permanently installed; locally or remotely controlled to provide point or sector protection, mitigation, and suppression capabilities to defend against fires. The device can be deployed on land or on water.

According to a method of the invention, fire control is achieved by the operation of the air mover in which optimum airflow velocities, volumes, and directional airflows are provided. Selected amounts of fire suppressants or retardants are provided at selected times in order to optimize the fire control.

Considering various features of the invention and corresponding embodiments to be further disclosed herein, in one aspect of the invention, it may be considered an air mover device for use in firefighting, comprising: (a) an air mover unit to produce a selected volume and velocity of a discharged airstream therefrom; (b) a transmission or other speed control device coupled to said air mover unit for control of the volume and velocity of a discharged airstream; (c) an air mover driver connected to the air mover unit to provide power to said air mover unit; (d) a first air rudder communicating with said discharged airstream to selectively and controllably direct the discharged airstream in a lateral direction; (e) a second air rudder communicating with said discharged airstream to selectively and controllably direct the discharged airstream in a vertical direction; and (f) a directional control assembly that enables selective and controllable directional control of the discharged airstream.

In another aspect of the device of the invention, the air mover device may employ the directional control assembly which includes a turntable to selectively and controllably direct the discharged airstream in a desired azimuthal direction, and a rack and pinion driven apparatus mounted on a turntable to selectively and controllably direct the discharged airstream in the vertical direction. For this aspect of the invention, the air mover device is mounted atop the directional control assembly and the directional control assembly is operated to direct the discharged airstream in the desired horizontal and vertical directions.

According to another aspect of the device of the invention, it may include a removable nozzle secured to the air mover at its discharge side or end to selectively and controllably direct the discharged airstream According to yet another aspect of the device of the invention, it may include a sparger unit that communicates with the discharged air stream for optional injection of a fire suppressant or retardant into the discharged air stream Considering other features of the invention and corresponding embodiments to be further disclosed herein, in yet another aspect of the invention, it may be considered a method of fighting a fire using an air mover device, comprising: (1) providing an air mover device comprising: (a) an air mover unit to produce a selected volume and velocity of a discharged airstream therefrom; (b) a transmission or other speed control device coupled to said air mover unit for control of the volume and velocity of the discharged airstream; (c) an air mover driver connected to the air mover unit to provide power to said air mover unit; (d) a first air rudder communicating with said discharged airstream to selectively and controllably direct the discharged airstream in a lateral direction; (e) a second air rudder communicating with said discharged airstream to selectively and controllably direct the discharged airstream in a vertical direction; (f) a directional control assembly on which an air mover device platform is mounted, the directional control assembly including a turntable to facilitate azimuthal movement of a discharged airstream and a rack and pinion assembly mounted on the turntable to facilitate vertical movement of a discharged airstream; 2) locate and approach a fire requiring control; (3) position the air mover device at a desired location in proximity to the fire; (4) energize the air mover unit to produce the selected volume and velocity and direction of the discharged airstream; (5) selectively operate first and second rudders, to directionally control the discharged airstream; and (6) optionally selectively operate a sparger unit to inject a desired amount of the suppressant or retardant over a selected period of time.

According to another aspect of either the air mover device or the method of the invention, these may further include (a) a removable nozzle mounted at an air mover discharge to selectively and controllably direct a discharged airstream; (b) a sparger unit communicating with the discharged air stream to inject a suppressant or retardant into the discharged air stream; and (c) balancing feet appropriately placed at the base of an air mover platform to ensure stability during operation;

Considering other various features of the invention and corresponding embodiments to be further disclosed herein, in one aspect of the invention, it may also be considered an air mover device with directional control for use in firefighting, comprising: (a) an air mover unit to produce a selected volume and velocity and direction of a discharged airstream therefrom; and (b) a directional control assembly on which an air mover device platform is mounted, the directional control assembly including a turntable to facilitate azimuthal movement of a discharged airstream and a rack and pinion assembly mounted on the turntable to facilitate vertical movement of a discharged airstream.

According to the aforementioned air mover device with directional control, in another aspect of the invention, it may optionally include any one or a combination of the following: a speed control element coupled to said air mover unit for control of the volume and velocity of the discharged airstream, at least one air rudder communicating with said discharged airstream to selectively and controllably direct the discharged airstream in a desired direction, an air mover driver connected to the air mover unit to provide power to said air mover unit; and a sparger unit communicating with the discharged air stream to inject a suppressant or retardant into the discharged air stream.

Further specific features and advantages of the invention will become apparent from a review of the Detailed Description taken in conjunction with the drawings and claims set forth below.

BRIEF DESCRIPTION OF THE DRAWINGS

The accompanying drawings, which are incorporated into and form a part of the specification, illustrate one of more embodiments of the present invention and, together with the description, serve to explain the principles of the invention. The drawings are only for the purpose of illustrating one or more preferred embodiments of the invention and are not to be construed as limiting the invention.

DETAILED DESCRIPTION

Figure 1:
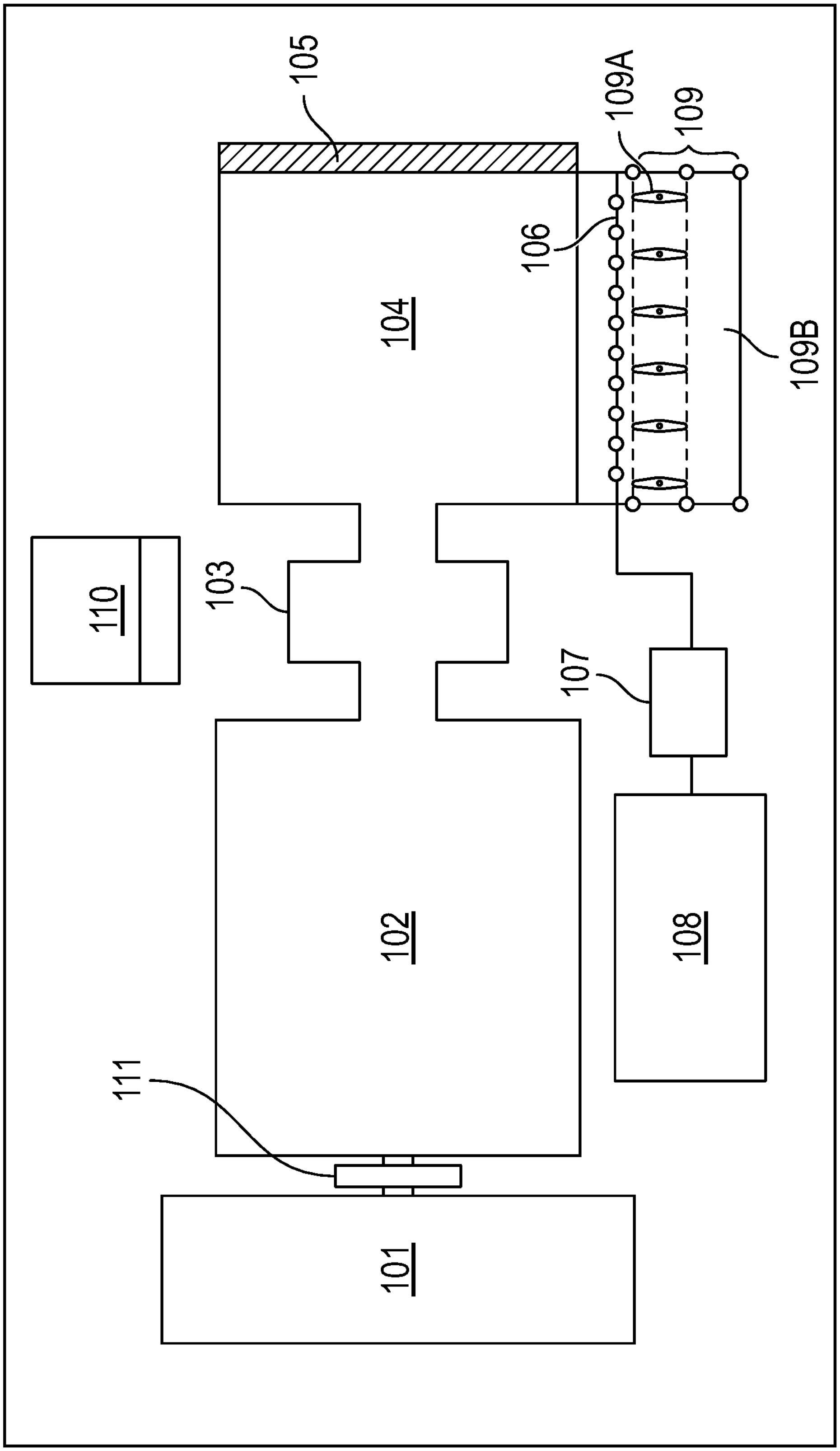
FIG. 1 is a schematic view of an air mover device of the invention in one preferred embodiment, illustrating the air mover in the form of a fan type or blower type for air movement.

Referring FIG. 1. an air mover device of the invention is shown in a plan view. The device includes a fossil fuel source (101) as a power supply to a driver (102) via a fuel pump (111). Other power options may include electrical power, such as generated from a generator, a battery, or photovoltaic sources (not shown). A driver is connected to a transmission (103), speed reducer, or throttle control component that allows a large range of rotational speeds for an air mover unit (104), thus offering a range of airstream flows and airstream velocities.

An air mover unit (104) of the invention may include centrifugal and axial fans or blowers, specially designed fans or blowers, and propellers of two or more blades, including counter rotation arrangements. An inlet of the air mover unit may include an inlet screen (105) of various configurations, including a traveling screen arrangement which is intended to maintain an inlet screen clear of debris to protect air mover components in hostile fire environments.

A sparger unit (106) may be installed at the discharge area of the air mover unit (104). The sparger unit (106) may be employed to disburse suppressant or retardant compounds into a discharged airstream of the air mover unit. The sparger unit is connected via piping to an upstream pump (107) which in turn is connected via piping to a tank (108) for storing and supplying retardant or suppressant compounds. The pump (107) may be powered electrically (by battery, photoelectric, or other electric source) or mechanically from an air mover driver. Downstream of the sparger unit (106) is a control surface assembly (109) which enables a discharge airstream to be directionally controlled, both vertically and laterally.

The control surface assembly (109) includes at least one air rudder (109A) for controlling the lateral direction of the airstream and at least one air rudder (109B) for controlling the vertical direction of the airstream.

A control console (110) is provided for component control of the air mover device. The control console is spaced remotely from an airstream inlet. In addition to component controls, the control console may include instrumentation such as temperature, tank level indications, vibration monitoring, and other monitoring instrumentation for major components. Such instrumentation provides control and safety measures for proper operation of the device and to provide safety for operating personnel. Further, controls of the air mover device of the invention may be achieved locally or remotely, and monitoring instrumentation may be transmitted to remote locations.

Figure 2:
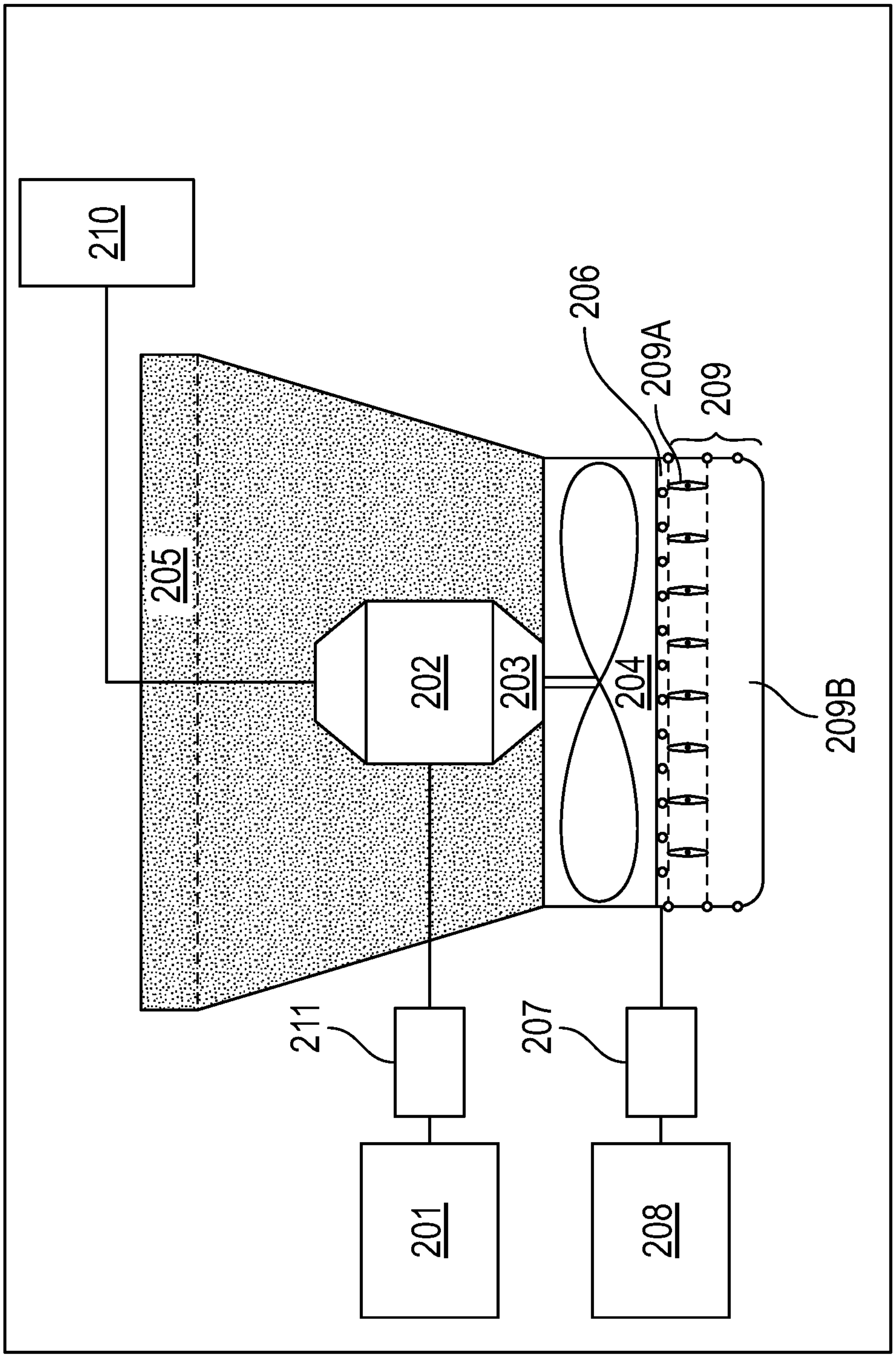
FIG. 2 is a schematic view of the air mover device of the invention in another preferred embodiment, illustrating the air mover incorporating a propeller for air movement.

FIG. 2 depicts a plan view of another embodiment of the air mover device of the invention. As shown, this embodiment includes a fossil fuel source (201) as a fuel supply to a driver (202) via a fuel pump (211). As with the first embodiment, other sources of power may be used including electrical power from a generator, a battery, or photovoltaic sources (not shown). A driver is connected to a transmission (203), speed reducer or throttle control component enabling a large range of rotational speeds for an air mover unit (204), thus offering a range of airstream flows and airstream velocities.

An air mover unit (204), like the first embodiment, may include centrifugal and axial fans or blowers, specially designed fans or blowers, and propellers of two or more blades, including counter rotation arrangements. An inlet of an air mover unit (205) may include an inlet screen (205) including a traveling screen arrangement intended to maintain an inlet screen clear of debris to protect air mover components in hostile fire environments. Inlet screen materials can be any appropriate size of wire mesh supported by a variety of tubing or other structural supports to stiffen the wire mesh and to prevent wire mesh distortion.

Again, like in the first embodiment, a sparger unit (206) may be installed at the discharge area of an air mover unit (204 to disburse suppressant or retardant compounds into a discharged airstream of an air mover unit. A sparger unit is again connected via piping to an upstream pump (207) which in turn is connected via piping to a tank (208) for storing and supplying retardant or suppressant compounds. A control surface assembly (209) again enables a discharge airstream to be directionally controlled, both vertically and laterally.

A control surface assembly (209) includes at least one air rudder (209A) for controlling the lateral direction of the airstream and at least one air rudder (209B) for controlling the vertical direction of the airstream.

Once again similar to the first embodiment, a control console (210) is provided for component control of an air mover device. A control console may also include desired instrumentation such as temperature, tank level indications, vibration monitoring, and other monitoring instrumentation for major components. Instrumentation provides control and safety for personnel and efficient and safe operation of the device. Controls of the air mover device of the invention may also be achieved locally or remotely, and monitoring instrumentation may be transmitted to remote locations.

Figure 3:
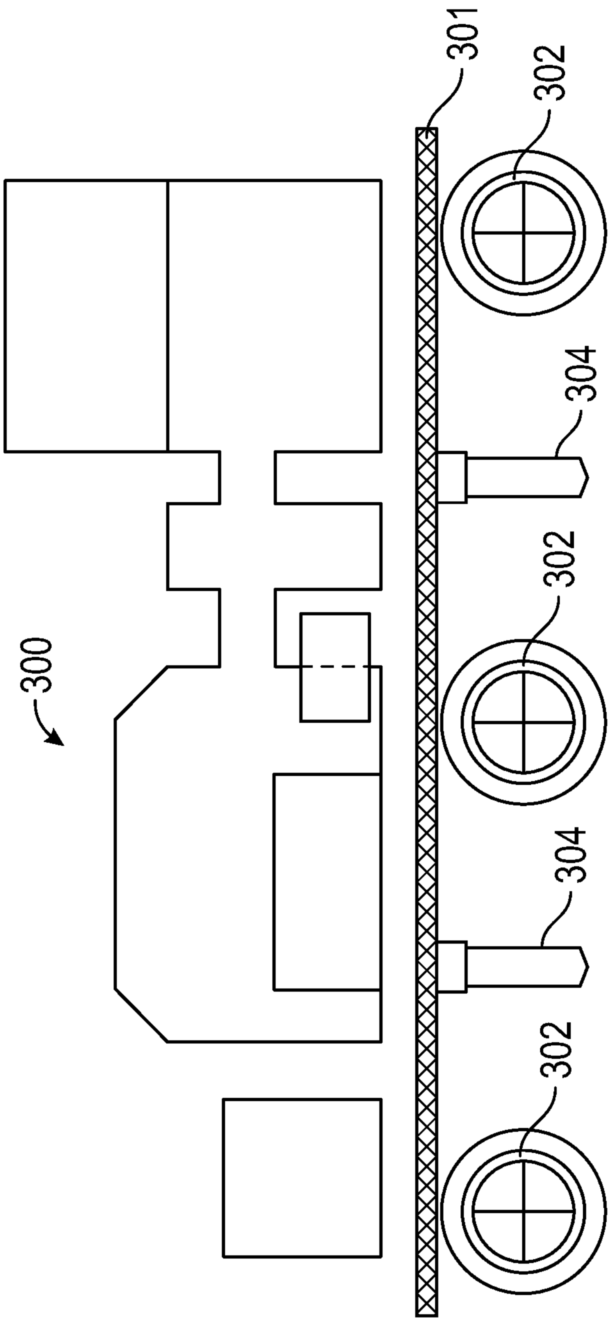
FIG. 3 is a schematic view of an air mover device platform, according to another preferred embodiment, enabling the air moving device to be mobile and depicting balancing feet to provide added stability to a device during operation.

FIG. 3 depicts an option for providing mobility for an air mover device. Specifically, FIG. 3 shows a transport platform (301) with wheels (302). A schematic representation of an air mover unit (300) is shown mounted on the transport platform (301). Balancing feet (304) are installed at appropriate locations to provide added stability of the air mover device during operation. Balancing feet may be deployed electrically, hydraulically, pneumatically, or manually.

Figure 4:
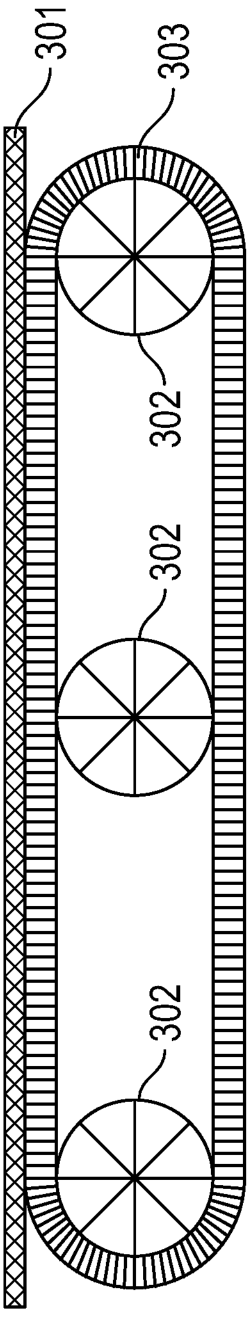
FIG. 4 is a schematic view of another air mover device platform, according to another preferred embodiment, again enabling an air moving device to be mobile.

FIG. 4 depicts another option to provide mobility, namely a platform (301) with a track drive (303) such as employed in a bulldozer or other tracked vehicle.

A platform according to any embodiment of the invention may be constructed of any materials to provide adequate strength to support an air mover device such as aluminum or steel. A platform may be towed in a trailer configuration, or the platform may be incorporated directly on a motorized transport vehicle. The platform may be of a waterborne design with any hull shape potentially satisfying the necessary design.

The components of an air mover device may be secured to a platform by bolts, welds, skids, or other means to ensure stability. An optimum design of securing components of a device to a platform allows components of a device to be easily removed and replaced with similar components with different performance characteristics, depending on the intended application.

Figure 5:
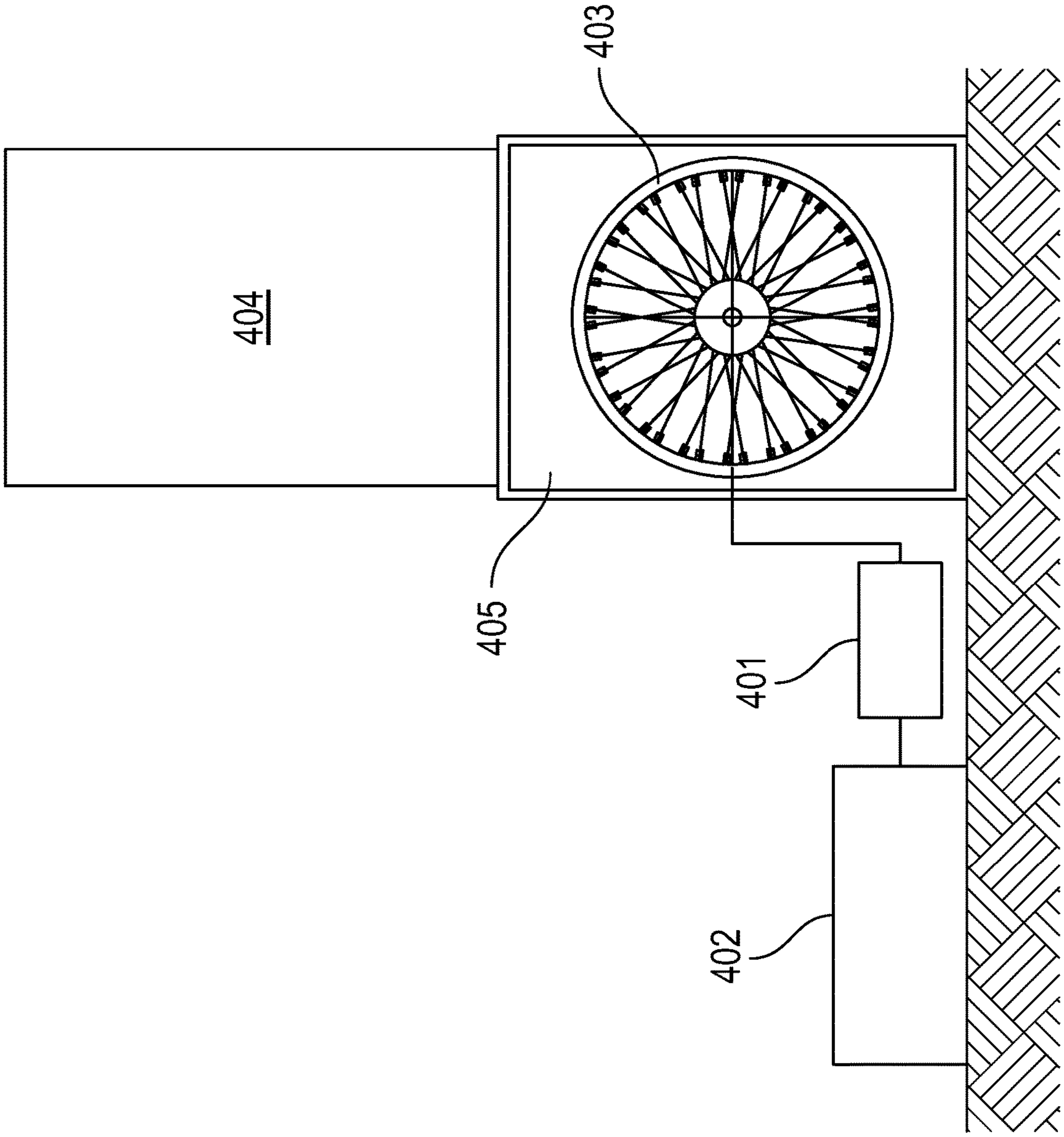
FIG. 5 is a schematic view showing an air mover sparger located at an air mover discharge.

FIG. 5 depicts an end view of a sparger unit according to embodiments of the invention. When initiated, a pump (401) transfers suppressant or retardant from a storage tank (402) via piping to a circumferential configuration of an air mover (404) sparger (403). A "sparger" unit according to the invention is an array of one or more orifices or apertures spaced around a circumferential length of piping at a discharge end of an air mover. Orifices/apertures emit a selected suppressant/retardant compound(s) under pressure into an airstream located at an air mover discharge end (405). An emission is preferably achieved to aerosolize compound(s) for maximum distribution across an airstream. Aerosolization enables more effective entrainment and dispersion into an air mover discharge airstream. A sparger unit may be installed either upstream or downstream of a control surface assembly and either upstream or downstream of an air mover.

Figure 6:
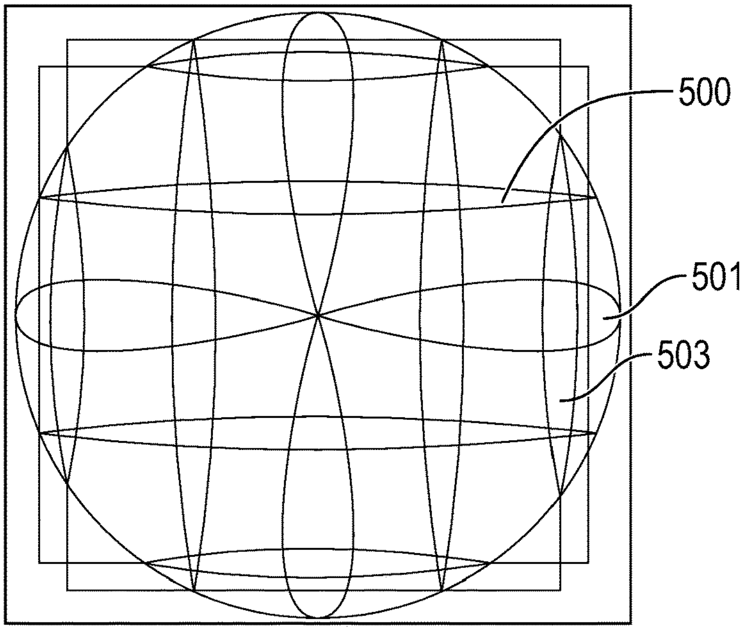
FIG. 6 is a schematic end view showing a discharge air rudder control surfaces of an air mover device.

FIG. 6 depicts a front view configuration of control surfaces (502 and 503) located downstream of a discharge of an air mover (501). As shown, there are two sets of control surfaces. One set of these control surfaces (503) is designed to move laterally to direct a discharge airstream from an air mover unit. A second set of control surfaces (502) is designed to move vertically to direct a discharge airstream from an air mover unit. The arrangement of control surfaces as provided allows an airstream to be optimally directed without having to move an air mover unit.

Figure 7:
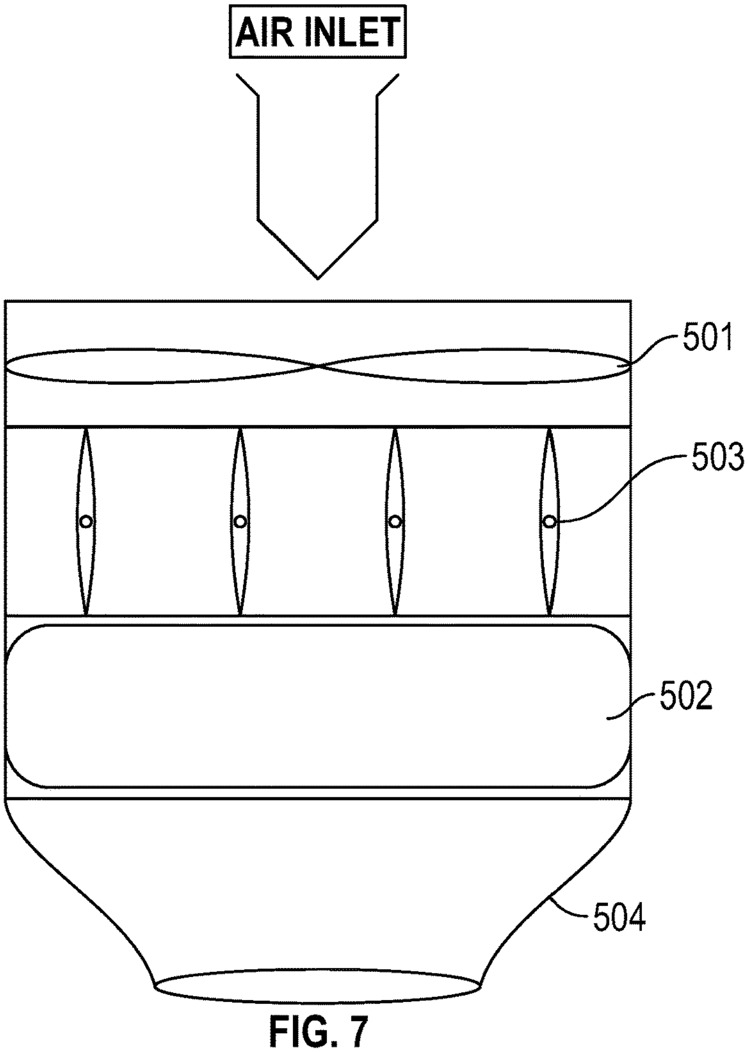
FIG. 7 is a schematic plan view showing the discharge air rudder control surfaces of the air mover device of FIG. 6 along with a removable discharge nozzle.

FIG. 7 shows a plan view of the configuration of air rudder control surfaces of FIG. 6 along with a view of a removable nozzle (504) at an air mover device airstream discharge.

Figure 8:
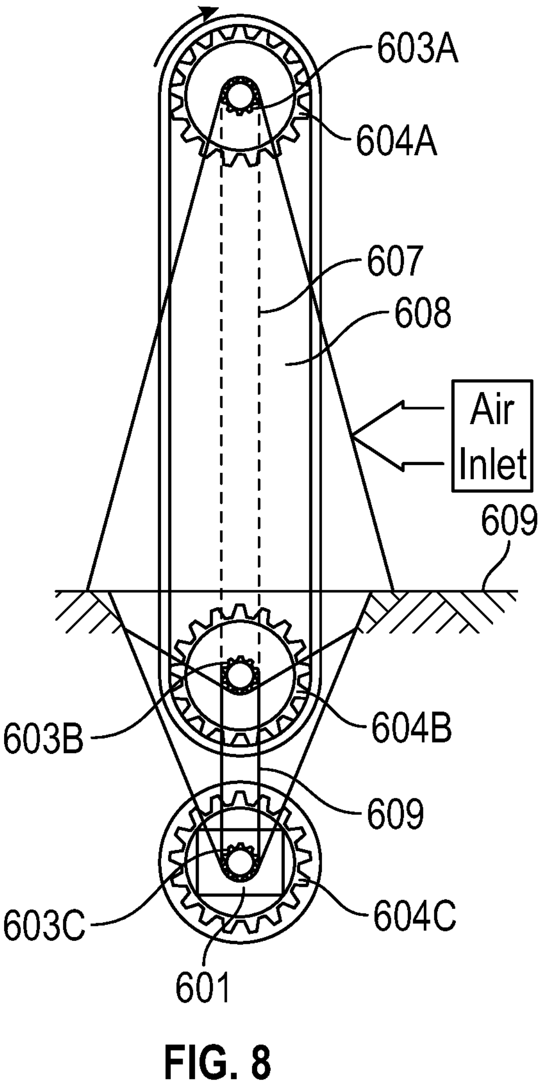
FIG. 8 is a schematic side view of an inlet of a protective traveling screen of an air mover device.
Figure 9:
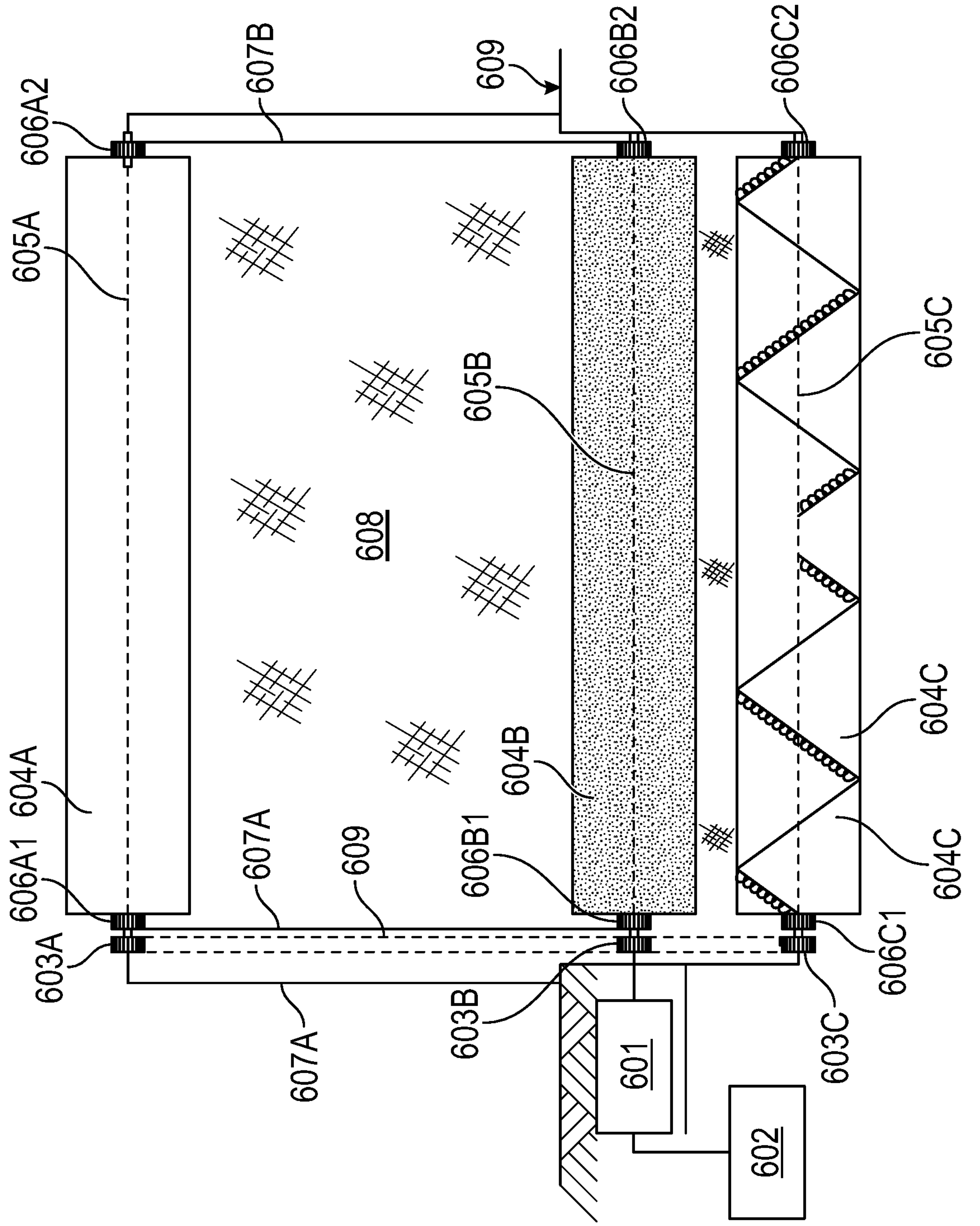
FIG. 9 is a schematic front view of the inlet of the traveling screen of FIG. 8.

FIGS. 8 and 9 show a configuration of an air mover unit inlet traveling screen that may be required in hostile fire environments with airborne debris. Specifically, FIG. 8 is a schematic side view of an inlet of a protective traveling screen of an air mover device and FIG. 9 is a schematic front view of an inlet of a protective traveling screen.

Any inlet of an air mover unit of the invention can be fitted with an inlet screen (shown as 105 in FIG. 1 and as 205 in FIG. 2) which may be generally described as a static tube and/or wire cage to protect rotating components of an air mover unit and to thus maintain the general integrity of an air mover unit by preventing entry of debris that could compromise operation. An inlet screen of the invention may be provided with or without a traveling (self-cleaning) screen portion. Since an inlet screen for an air mover unit without a traveling screen as a portion of this protective screen is a simple, obvious configuration, only a version of a traveling screen is depicted in these figures.

According to embodiments of the invention, a traveling screen will automatically remove by mechanical means, any objects trapped in a screen to keep a screen clear of debris and protect equipment while maintaining an uninterrupted flow of inlet air to an air mover unit. A traveling screen could be installed parallel and/or perpendicular to an inlet airstream. A traveling screen is preferably a flexible screen that is rotated by a motor (601) powered by a power supply (602), mechanical or electrical, and connected at roller 604B to sprockets (603A, B, and C) via a drive chain (609) which in turn are connected to rollers (604A, B, and C) that serve to maintain the motion and cleanliness of a traveling screen.

An upper roller (604A) serves as an upper support and guide for a traveling screen. Roller 604A is supported by a shaft (605A) which is mounted at each end into a support bearing (606A1 and 606A2). Shaft 605A and its bearings (606A1 and 606A2) are supported by vertical sides (607A and 607B) of a roller/screen assembly. The vertical sides are attached to a platform base.

Roller 604B is supported by a shaft (605B) which is mounted at each end into a support bearing (606B1 and 606B2). Shaft 605B and its bearings (606B1 and 606B2) are supported by vertical sides 607A and 607B of a roller screen assembly which are attached to a platform base. Roller 604B according to one embodiment may be a stiff bristle that is capable of sweeping trapped debris away from a screen material as the screen is rotated and meshed into a bristle composition of roller 604B.

Roller 604C is located outside of the screen and below roller 604B. Roller 604C is also supported by a shaft (605C) mounted at each end into a support bearing (606C1 and 606C2). Shaft 605C and its bearings (606C1 and 606C2) are supported by vertical sides 607A and 607B of an assembly which are attached to a platform base. Roller 604C may be an auger type brush to catch debris falling from roller 604B. Roller 604C transports debris to each end of roller 604C by a reverse thread design of brush configuration on one end relative to the other.

It is preferable for rollers 604B and 604C to be mounted below a platform base (609) to ensure debris removed from the screen is not entrained back into the inlet airstream.

A screen portion (608) is sufficiently flexible and sufficiently rigid to maintain its integrity and still be rotatable around rollers 604A and 604B. Screen material position will be maintained by a sprocket-like end piece at each end of rollers 604A and 604B. Flexibility will be established by hinge joints at appropriate intervals which extend transversely across an entire dimension of a screen material.

A traveling screen assembly is supported on an air mover device platform base by an arrangement of supports (607A and 607B).

Figure 10:
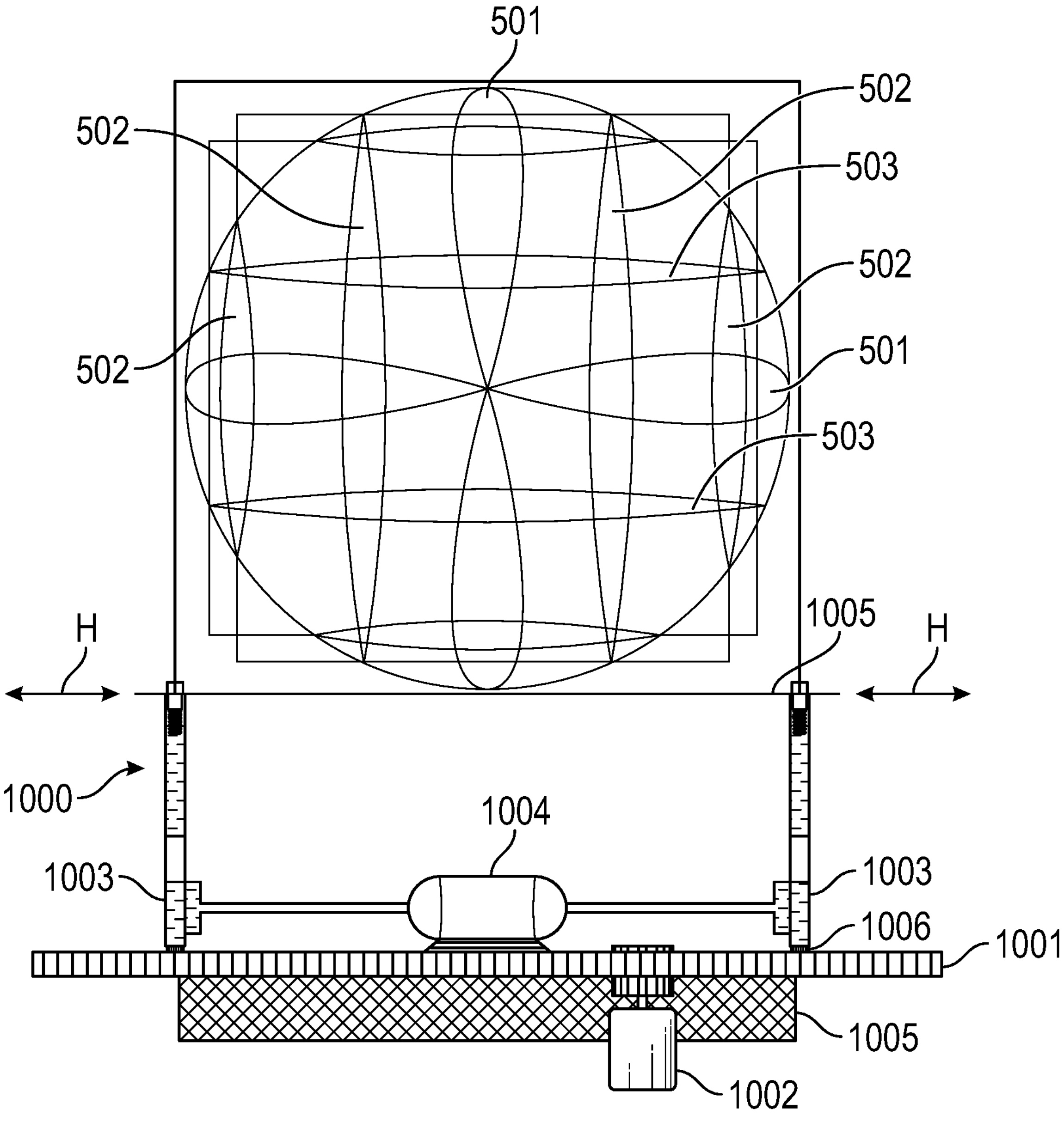
FIG. 10 is a schematic front or side view of the directional control assembly that may be used to directionally control the discharge airstream.
Figure 11:
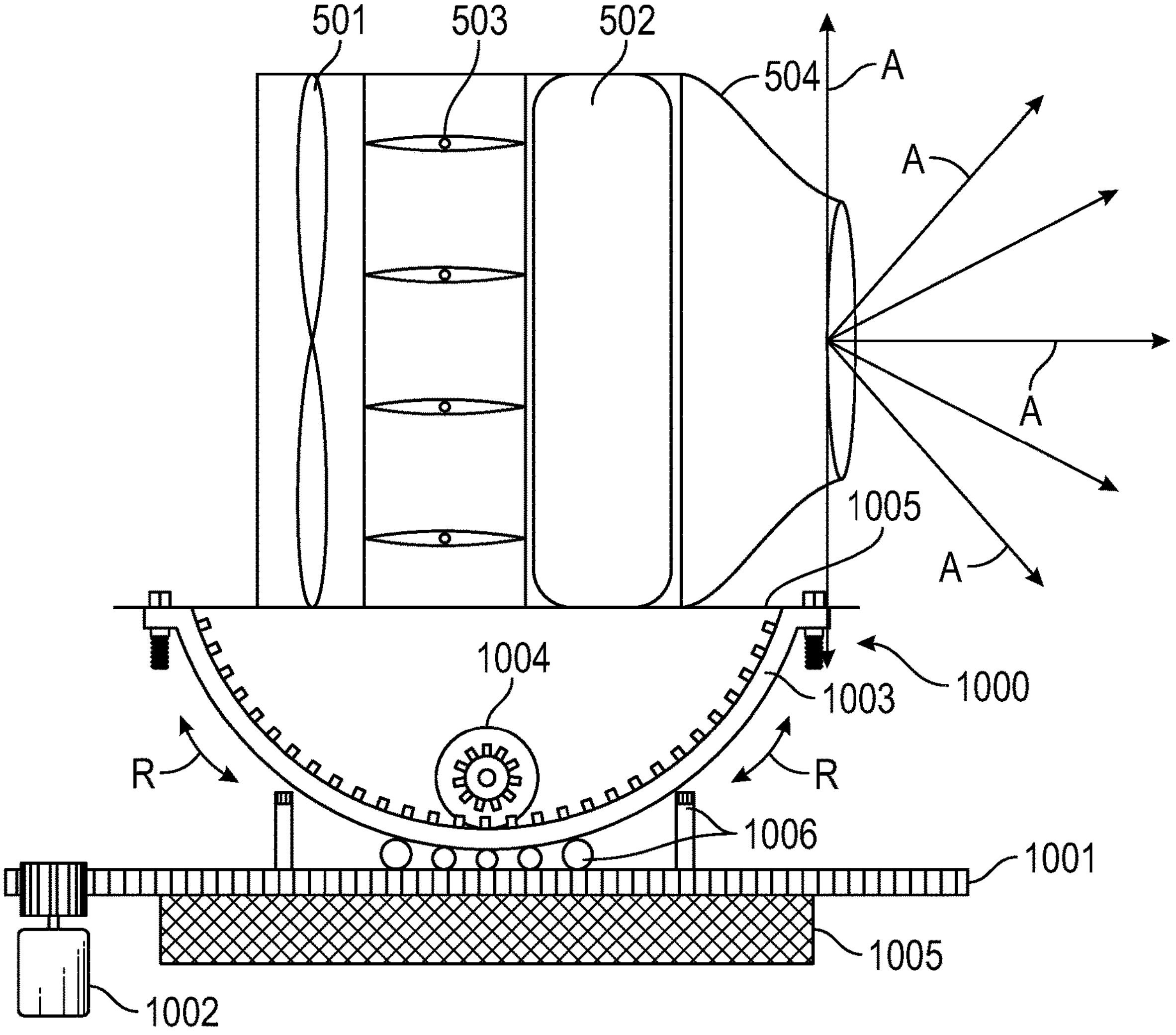
FIG. 11 is a schematic front or side view of the directional control assembly.

Referring to FIGS. 10 and 11, according to another preferred embodiment of the invention, a schematic representation of the air mover device is shown as mounted upon a directional control assembly (1000). FIG. 10 more specifically shows an elevation view for horizontal adjustment capability for the discharged airstream while FIG. 11 shows an elevation view rotated at approximately 90 degrees for vertical adjustment capability for the discharged air stream.

The directional control assembly (1000) includes a turntable (1001) with motor drive (1002) to enable the air mover device to be positioned horizontally and to therefore adjust the horizontal positioning of the discharged airstream. The horizontal direction arrows H indicate the capability of the turntable to shift the air mover device left or right as one views FIG. 10. FIG. 11 illustrates a rack-and-pinion assembly (1003) with a rack and pinion motor (1004) to enable the air mover device to be rotated as shown by the rotational arrows R thereby causing an angular change in the direction of the discharged airstream. The discharged airstream in FIG. 11 is denoted by the directional arrows A in which the angular change of the air mover device as it may be rotated on a mounting surface (1005) thereby adjusts the vertical angle of the discharged airstream. Both a turntable and a rack and pinion assembly are supported by a bearing surface (1005 and 1006, respectively) to permit smooth operation. Use of this device may be used in conjunction with, or in place of, air rudders to selectively and controllably direct an air mover discharge airstream. The directional control assembly may be operated and positioned electrically, pneumatically, hydraulically, or manually. Using this mode of airstream directional control avoids airstream pressure losses which may be encountered using air rudders. Avoiding these pressure losses may optimize the performance of an air mover device.

It should be noted that the air mover device is shown in schematic form in FIGS. 10 and 11, and therefore, the actual orientation of the air mover device when mounted to the turntable (1001) could be modified so that the direction of travel of the discharge airstream is normally horizontal, vertical or any other desired angle depending upon the particular configuration of a housing structure (not shown) which houses the components of the air mover device. Accordingly, it is contemplated that in order to effectively mount the air mover device on the turntable, the housing of the air mover device may have supporting surfaces (not shown) angled to orient the air mover device for air discharge at a normally horizontal position or other desired angular positions.

Current firefighting apparatuses depend on suppressant and/or retardant compounds for direct combat against a fire. These compounds depend on a storage tank inventory. The inventory of these compounds is therefore limited, and when used with continuous flow, will last only a matter of minutes. While retardants and suppressants have unique attributes of heat capacity and/or fire-resistant coatings to eliminate heat and/or flame, these compounds must be applied with precision and are extremely limited in quantity when in a remote fire area due to general absence of replenishment capabilities.

The present invention relies on the use of high volume, high velocity air movement control. Air is essentially infinite in quantity and availability. Therefore, the limitation on performance of this invention is limited only by fuel inventory available to supply power to an air mover. Regardless of the type of power source (e.g., fossil fuel or electric), an air mover device of the invention can remain on the scene to effectively fight the fire for many hours, not a few minutes. A generated airstream can be directed both horizontally and vertically with the use of air rudders, and/or the directional control assembly.

An airstream from an air mover device of the invention can be applied at high volumetric flow rates for hours rather than minutes. Hours of operation may provide a substantial factor in fire suppression through cooling. Much of the water stream evaporates before reaching the flames, and any water that does reach the flames has a very local effect. The motive force of a directed airstream is not diminished by the heat, and the spread of an airstream covers a much larger area than an aimed fire hose. About 6 cubic feet of air at approximately 100 degrees Fahrenheit from an air mover airstream will reduce the temperature of about one cubic foot of the hottest air temperature of a wildland fire (about 2000 deg. F.) to below the kindling temperature of most wildland fuels. At hundreds of thousands of cubic feet per minute, air mover airstream flow rates from each deployed unit can reduce thousands of cubic feet of wildland fire gas temperatures to below those necessary for combustion.

An air mover device of the invention also may serve in a fire suppression manner by having its airstream directed at the flames to force the flames "back on black", i.e., forcing the flames back onto already burned fuel areas.

An air mover device of the invention has application in a suppression manner through the use of a device sparger unit which will introduce an aerosolized stream of suppressant or retardant into an air mover discharge airstream. The inventory of suppressant/retardant would be limited as in current art fire apparatus.

An airstream from an air mover device of the invention can be used for indirect fire attack by countering or redirecting natural and fire-generated air flows and thus altering fire direction and behavior. The high volume, high velocity airstream, when properly directed, can provide a vector of air flow that can change the course of the flame front. An air mover discharge airstream also can redirect or repel smoke or embers from a fire, resulting in protection of designated property.

In a back-burn effort, an airstream from an air mover device of the invention can promote flame generation and provide flame direction by applying an airstream discharge to a back-burn flame front. Speed control of an air mover can start driving a flame front at low speed/low flow while a back-burn flame front is initiated close to an air mover. As a flame front progresses away from an air mover, air mover speed can be progressively increased to maintain the effectiveness of a generated airstream to push a back-burn further and further away from an air mover to increase the back-burn area. In this manner a back-burn process may be accomplished more quickly and with more control despite possibly encountering contrary, naturally generated air flows.

Other functions that can be achieved by the air mover device of the invention include: (1) Creating "anchor points" from which additional fire lines or suppression efforts may safely extend; (2) Creating fire breaks with the force of a developed airstream directed at very close proximities to the ground; (3) Providing a safe zone in the lee of a device airstream for fire crews and/or civilians for possible protection or escape from a fire danger zone; (4) Providing a method of drying back-burn fuels to promote ignition and control of the back-burn process; (5) Gathering test data by establishing prescribed moisture content in fuels for studies in back-burn efforts; and (6) Assisting in cold trailing efforts to both identify and extinguish remaining hot spots.

An air mover device of the invention can be designed and installed to provide reliability in hostile fire environments and will be monitored with onboard instrumentation (with local and/or remote readouts) to ensure its design limits are not exceeded during its deployment. This may include a sprinkler system to provide fire suppression for device components. An air mover device with its components may be controlled locally or remotely using controls and signals from a control and instrumentation console mounted on a device platform. A device may be installed as a stationary platform or a mobile platform, either on a towed platform or on a motorized platform. There may be variations between one device and another depending on the specific needs of the situation in which it may be deployed. Fire conditions may demand different specifics regarding air device attributes or components, (such as air mover flow rates, suppression material inventory, sparger output, device intake protection screens, platform ruggedness, etc.), but the basic components of a device will remain similar. More than one air mover device may be mounted on the same platform as space and needs permit, and more than one device may be employed in any given fire situation.

The air mover device of the invention can be deployed on land or on water. A waterborne air mover device may be deployed on any hull shape and may employ all the features of a land device as well as utilization of anchors and winches (manual or automatic) for positioning a device and directing a discharge airstream with or without a rudder and/or the directional control assembly.

Although the invention has been described in detail with particular reference to these preferred embodiments, other embodiments can achieve the same results. Variations and modifications of the present invention will be obvious to those skilled in the art, and it is intended to cover in the appended claims all such modifications and equivalents.

What is claimed is:

1. An air mover device for use in firefighting, comprising:

an air mover unit to produce a selected volume and velocity of a discharged airstream therefrom;

a transmission for speed control coupled to said air mover unit for control of the volume and velocity of the discharged airstream;

an air mover driver connected to the air mover unit via the transmission to provide power to said air mover unit;

at least one air rudder communicating with said discharged airstream to selectively and controllably direct the discharged airstream in a lateral or vertical direction;

wherein the at least one air rudder includes a first air rudder having a first side and a second opposite side that is placed in contact with said discharged airstream to selectively and controllably direct the discharged airstream, and a second air rudder having a first side and a second opposite side that is placed in contact with said discharged airstream to selectively and controllably direct the discharged airstream in a vertical direction;

wherein the first and second air rudders act as airfoils to direct the discharged airstream by contact of said respective first and second opposite sides with said discharged airstream;

a sparger unit communicating with said discharged air stream that injects a suppressant or retardant into the discharged air stream;

a directional control assembly upon which said air mover unit is mounted, said directional control assembly including a turntable to selectively and controllably direct the discharged airstream in a horizontal direction, and a rack and pinion assembly to selectively and controllably direct the discharged airstream in a vertical direction.

2. The device of claim 1, further including:

a protective screen located at an inlet of an air mover unit.

3. The device of claim 1, wherein:

a protective screen has a self-cleaning function and comprises a plurality of rollers driven by a motor.

4. The device of claim 1 wherein:

said air mover driver is controlled locally or remotely.

5. The device of claim 1 wherein:
a speed of the air mover unit is controlled locally or remotely to establish a range of air flow volumes and air velocities to address varying fire situations encountered.

6. The device of claim 1 wherein:
the at least one air rudder is controlled locally or remotely to direct an airstream laterally left to right and right to left.

7. The device of claim 1 wherein:
the at least one air rudder is controlled locally or remotely to direct an airstream vertically up and down and down and up.

8. The device of claim 1 wherein:
said at least one air rudder includes a first air rudder communicating with said discharged airstream to selectively and controllably direct the discharged airstream in the lateral direction
and a second air rudder communicating with said discharged airstream to selectively and controllably direct the discharged airstream in the vertical direction.

9. The device of claim 1, further including:
a platform secured to and arranged to support said air mover device.

10. The device of claim 1 wherein:
said platform is incorporated on a towed trailer assembly or incorporated on a motorized transport vehicle.

11. The device of claim 1 wherein:
said sparger unit includes a sparger pump that is controlled to provide varying output pressures to thereby control through-flow restrictions output flow rates of aerosolized suppressant or retardants from a sparger unit.

12. The device of claim 1 wherein:
said removable nozzle can be attached to effectively focus an airstream and increase the throw of a discharge airstream.

13. The device of claim 1 wherein:
said balancing feet are placed strategically around the base of an air mover platform to provide platform stability during air mover operation.

14. The device of claim 1 wherein:
more than one air mover device may be employed on a single platform.

15. The device of claim 1 wherein: associated instrumentation can be monitored locally and/or
remotely.

16. An air mover device for use in firefighting, comprising:
an air mover unit to produce a selected volume and velocity of a discharged airstream therefrom;
a transmission for speed control coupled to said air mover unit for control of the volume and velocity of the discharged airstream;
an air mover driver connected to the air mover unit via the transmission to provide power to said air mover unit;
at least one air rudder communicating with said discharged airstream to selectively and controllably direct the discharged airstream in a lateral or vertical direction;
wherein the at least one air rudder includes a plurality of first air rudders having each having first side and a second opposite sides that are placed in contact with said discharged airstream to selectively and controllably direct the discharged airstream, and a plurality of second air rudders each having a first side and a second opposite side that are placed in contact with said discharged airstream to selectively and controllably direct the discharged airstream in a vertical direction;
wherein the plurality of first air rudders are disposed substantially perpendicular to said plurality of second air rudders;
a sparger unit communicating with said discharged air stream that injects a suppressant or retardant into the discharged air stream;
a directional control assembly upon which said air mover unit is mounted, said directional control assembly including a turntable to selectively and controllably direct the discharged airstream in a horizontal direction, and a rack and pinion assembly to selectively and controllably direct the discharged airstream in a vertical direction.

* * * * *